United States Patent
Huang et al.

(10) Patent No.: US 11,681,875 B2
(45) Date of Patent: Jun. 20, 2023

(54) METHOD FOR IMAGE TEXT RECOGNITION, APPARATUS, DEVICE AND STORAGE MEDIUM

(71) Applicant: Beijing Baidu Netcom Science Technology Co., Ltd., Beijing (CN)

(72) Inventors: Xiangkai Huang, Beijing (CN); Leyi Wang, Beijing (CN); Lei Nie, Beijing (CN); Siyu An, Beijing (CN); Minghao Liu, Beijing (CN); Jiangliang Guo, Beijing (CN)

(73) Assignee: BEIJING BAIDU NETCOM SCIENCE TECHNOLOGY CO., LTD. (CN)

( * ) Notice: Subject to any disclaimer, the term of this patent is extended or adjusted under 35 U.S.C. 154(b) by 379 days.

(21) Appl. No.: 16/984,231

(22) Filed: Aug. 4, 2020

(65) Prior Publication Data
US 2021/0081729 A1    Mar. 18, 2021

(30) Foreign Application Priority Data
Sep. 16, 2019   (CN) .......................... 201910870990.7

(51) Int. Cl.
*G06F 17/00*     (2019.01)
*G06F 40/30*     (2020.01)
(Continued)

(52) U.S. Cl.
CPC .............. *G06F 40/30* (2020.01); *G06V 10/82* (2022.01); *G06V 30/19173* (2022.01);
(Continued)

(58) Field of Classification Search
CPC .... G06V 30/274; G06V 10/23; G06V 30/413; G06V 10/82; G06V 30/19173;
(Continued)

(56) References Cited

U.S. PATENT DOCUMENTS 11,468,051 B1 *  10/2022  Ranzinger ............... G06F 16/51
2002/0051575 A1 *  5/2002  Myers ..................... G06V 20/63
                                                                    382/202
(Continued)

FOREIGN PATENT DOCUMENTS

| CN | 106960206 A | 7/2017 |
| CN | 107480680 A | 12/2017 |
| CN | 109522553 A | 3/2019 |

*Primary Examiner* — Laurie A Ries
(74) *Attorney, Agent, or Firm* — Dilworth IP, LLC

(57) ABSTRACT

The present application discloses a method for image text recognition, an apparatus, a device, and a storage medium, and relates to image processing technologies in the field of cloud computing. A specific implementation is: acquiring an image to be processed, where at least one text line exists in the image to be processed; processing each text line in the image to be processed to obtain a composite encoded vector corresponding to each word in each text line, where the composite encoded vector carries semantic information and position information; and determining a text recognition result of the image to be processed according to the semantic information and the position information carried in the composite encoded vector corresponding to each word in each text line. This technical solution can accurately distinguish adjacent fields with small pixel spacing in the image and improve the accuracy of text recognition in the image.

13 Claims, 6 Drawing Sheets

(51) Int. Cl.
*G06V 30/262* (2022.01)
*G06V 30/413* (2022.01)
*G06V 30/19* (2022.01)
*G06V 10/82* (2022.01)
*G06V 30/412* (2022.01)
*G06V 30/28* (2022.01)

(52) U.S. Cl.
CPC .......... *G06V 30/274* (2022.01); *G06V 30/412* (2022.01); *G06V 30/413* (2022.01); *G06V 30/293* (2022.01)

(58) Field of Classification Search
CPC .... G06V 30/293; G06V 30/412; G06V 20/62; G06F 40/30
See application file for complete search history.

(56) References Cited

U.S. PATENT DOCUMENTS

| | | | |
|---|---|---|---|
| 2017/0206435 A1* | 7/2017 | Jin | G06K 9/628 |
| 2017/0270100 A1* | 9/2017 | Audhkhasi | G06F 40/289 |
| 2021/0042474 A1* | 2/2021 | Liu | G06N 3/04 |
| 2022/0318995 A1* | 10/2022 | Chen | G16H 50/70 |

\* cited by examiner

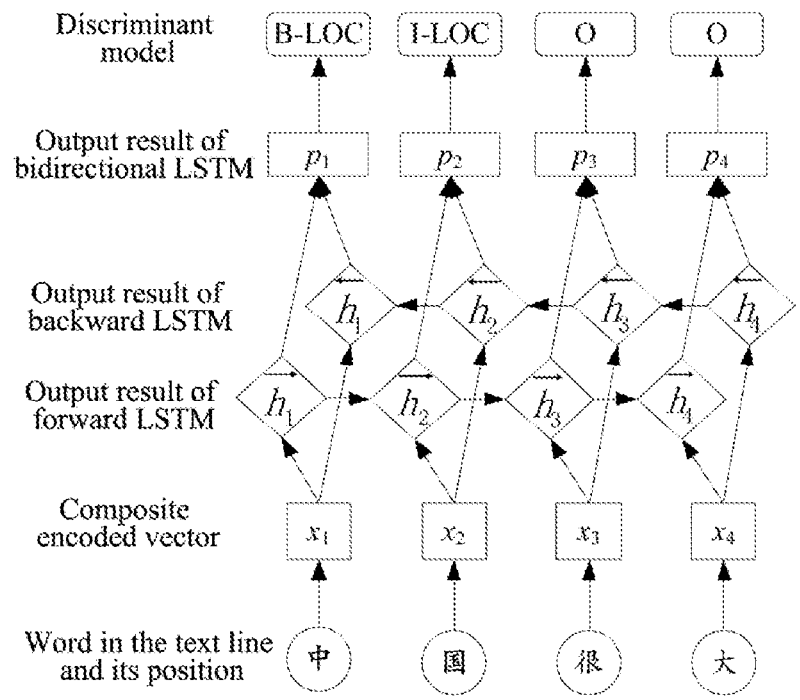

FIG. 5

Determining a range of each field in each text line according to the text recognition result of the image to be processed, where each field includes multiple words of which context semantic information is related to each other — S601

Determining actual meaning of text in the image to be processed according to context semantic information of all words in the same field in each text line — S602

FIG. 6

XXX Hospital
Patient expense list

| Patient ID | Hospitalization number | Name | Category | Discharge time | Hospital stay |
|---|---|---|---|---|---|
| xxxx | xxxx | xxxx | xxxx | xxxx-xx-xx | 3 |

| Category | Project Name | Specifications | Unit | Unit Price | Quantity | Valuation amount | Amount payable |
|---|---|---|---|---|---|---|---|
| Health materials expense | 敷料（抽丝纱布） Dressing (spinning gauze) | 16层未知 Unknown 16 layers | 块 Block | 2.1100 | 4 | 6.4400 | 6.4400 |
| | Disposable laryngoscope | Ordinary scientific innovation | Piece | 88.0000 | 1 | 88.0000 | 88.0000 |

FIG. 7

XXX Hospital
Patient expense list

| Patient ID: | Hospitalization number | Name | Category | Discharge time | Hospital stay |
|---|---|---|---|---|---|
| xxxx | xxxx | xxxx | xxxx | xxxx-xx-xx | 3 |

| Category | Project Name | Specifications | Unit | Unit Price | Quantity | Valuation amount | Amount payable |
|---|---|---|---|---|---|---|---|
| Health materials expense | 敷料（抽丝纱布） Dressing (spinning gauze) | 16层未知 Unknown 16 layers | 块 Block | 2.1100 | 4 | 6.4400 | 6.4400 |
| | Disposable laryngoscope | Ordinary scientific innovation | Piece | | 1 | 88.0000 | 88.0000 |

FIG. 8

METHOD FOR IMAGE TEXT RECOGNITION, APPARATUS, DEVICE AND STORAGE MEDIUM

CROSS-REFERENCE TO RELATED APPLICATION

This application claims priority to Chinese Patent Application No. 201910870990.7, filed on Sep. 16, 2019, which is hereby incorporated by reference in its entirety.

TECHNICAL FIELD

The present disclosure relates to the field of computer technologies and, in particular, to a method for image text recognition, an apparatus, a device, and a storage medium in image processing technologies.

BACKGROUND

Optical character recognition (OCR) refers to the process of analyzing and recognizing image documents of text materials and obtaining text and layout information. In the actual application process, after the image recognition, it is usually necessary to segment the consecutive text of the image representation layer at a text semantic level to distinguish the semantic difference between different fields.

However, the text detection process of the existing OCR method is completely dependent on the semantic information of an image, and adjacent fields with small pixel spacing in the image cannot be distinguished, resulting in low recognition accuracy.

SUMMARY

Embodiments of the present application provide a method for image text recognition, an apparatus, a device, and a storage medium, which are used to solve the problem of low recognition accuracy in the existing OCR method which cannot distinguish adjacent fields with small pixel spacing in an image.

In a first aspect, the present application provides a method for image text recognition, including:

acquiring an image to be processed, where at least one text line exists in the image to be processed;

processing each text line in the image to be processed to obtain a composite encoded vector corresponding to each word in each text line, where the composite encoded vector carries semantic information and position information; and determining a text recognition result of the image to be processed according to the semantic information and the position information carried in the composite encoded vector corresponding to each word in each text line.

In this embodiment, when image text recognition is performed, not only are the semantic features of the text used, but also the position information of the text on the image is fused, which can accurately distinguish adjacent fields with small pixel spacing in the image and improve the accuracy of text recognition in the image.

In a possible design of the first aspect, the processing each text line in the image to be processed to obtain a composite encoded vector corresponding to each word in each text line, includes:

analyzing semantics of each word in each text line in the image to be processed to obtain a semantic encoded vector corresponding to each word in each text line;

determining coordinate information of each word in each text line in the image to be processed;

performing encoding and dimensional transformation on the coordinate information of each word to obtain a position encoded vector of each word, where a dimension of the position encoded vector is the same as a dimension of the semantic encoded vector; and fusing the semantic encoded vector and the position encoded vector of each word to obtain the composite encoded vector of each word.

In this embodiment, the composite encoded vector of each word is obtained by fusing the semantic encoded vector and the position encoded vector of each word, and carries accurate semantic information and position information, therefore the words belonging to different fields in a certain type of area (such as a table area) which have no obvious semantic difference (such as multiple consecutive numeric columns) can be accurately divided, thereby improving the accuracy rate of subsequent image text recognition.

Optionally, the analyzing semantics of each word in each text line in the image to be processed to obtain a semantic encoded vector corresponding to each word in each text line includes:

for each word in the image to be processed, weighting and fusing semantic information of all words in the text line to which the each word belongs to obtain the semantic encoded vector of the each word.

In this embodiment, the semantic encoded vector of each word is obtained by weighting and fusing, which improves the accuracy rate of the semantic encoded vector.

Optionally, the performing encoding and dimensional transformation on the coordinate information of each word to obtain a position encoded vector of each word includes:

determining multiple pixel points representing each word in the image to be processed;

determining a position vector of each word according to coordinate information of the multiple pixel points corresponding to each word; and performing dimensional transformation on the position vector of each word according to the dimension of the semantic encoded vector corresponding to each word to obtain the position encoded vector having the same dimension as the semantic encoded vector.

In this embodiment, multiple pixel points of each word are used to determine the position vector of each word, which is transformed into the position encoded vector having the same dimension as the semantic encoded vector, thereby providing implementation possibility for subsequent vector fusion.

In another possible design of the first aspect, the determining a text recognition result of the image to be processed according to the semantic information and the position information carried in the composite encoded vector corresponding to each word in each text line includes:

inputting the composite encoded vector corresponding to each word in each text line into a preset information analysis network to determine context information of each word, where the preset information analysis network is used to analyze the context information of each word;

determining a category label to which each word belongs according to the context information of each word; and inputting the context information of each word in each text line and the category label to which each word belongs into a discriminant model to obtain the text recognition result of the image to be processed.

In this embodiment, by determining the context information of each word and the category to which it belongs, and then using the discriminant model to classify the category label, the fields in the text line can be segmented effectively, thereby laying a foundation for subsequently obtaining the accurate text recognition result.

In still another possible design of the first aspect, before processing each text line in the image to be processed to obtain a composite encoded vector corresponding to each word in each text line, the method further includes:

performing optical character recognition on the image to be processed, and determining text lines in the image to be processed and the position information of each word in each text line.

In yet another possible design of the first aspect, the method further includes:

determining a range of each field in each text line according to the text recognition result of the image to be processed, where each field includes multiple words of which context semantic information is related to each other; and determining actual meaning of text in the image to be processed according to the context semantic information of all words in a same field in each text line.

In this embodiment, each text line is segmented according to the range of each field, which realizes accurate sentence breaking to determine the actual meaning of the text in the image to be processed, and brings great convenience for the subsequent OCR text structured work.

In a second aspect, the present application provides an apparatus for image text recognition, including: an acquiring module, a processing module, and a determining module;

the acquiring module is configured to acquire an image to be processed, where at least one text line exists in the image to be processed;

the processing module is configured to process each text line in the image to be processed to obtain a composite encoded vector corresponding to each word in each text line, where the composite encoded vector carries semantic information and position information; and the determining module is configured to determine a text recognition result of the image to be processed according to the semantic information and the position information carried in the composite encoded vector corresponding to each word in each text line.

In a possible design of the second aspect, the processing module is specifically configured to: analyze semantics of each word in each text line in the image to be processed to obtain a semantic encoded vector corresponding to each word in each text line; determine coordinate information of each word in each text line in the image to be processed; perform encoding and dimensional transformation on the coordinate information of each word to obtain a position encoded vector of each word, where a dimension of the position encoded vector is the same as a dimension of the semantic encoded vector; and fuse the semantic encoded vector and the position encoded vector of each word to obtain the composite encoded vector of each word.

Optionally, that the processing module is configured to analyze semantics of each word in each text line in the image to be processed to obtain a semantic encoded vector corresponding to each word in each text line, is specifically that:

the processing module is specifically configured to: for each word in the image to be processed, weight and fuse semantic information of all words in the text line to which the each word belongs to obtain the semantic encoded vector of the each word.

Optionally, that the processing module is configured to perform encoding and dimensional transformation on the coordinate information of each word to obtain a position encoded vector of each word, is specifically that:

the processing module is specifically configured to: determine multiple pixel points representing each word in the image to be processed; determine a position vector of each word according to coordinate information of the multiple pixel points corresponding to each word; and perform dimensional transformation on the position vector of each word according to the dimension of the semantic encoded vector corresponding to each word to obtain the position encoded vector having the same dimension as the semantic encoded vector.

In another possible design of the second aspect, the determining module is specifically configured to: input the composite encoded vector corresponding to each word in each text line into a preset information analysis network to determine context information of each word, where the preset information analysis network is used to analyze the context information of each word; determine a category label to which each word belongs according to the context information of each word; and input the context information of each word in each text line and the category label to which each word belongs into a discriminant model to obtain the text recognition result of the image to be processed.

In still another possible design of the second aspect, the processing module is further configured to: before processing each text line in the image to be processed to obtain the composite encoded vector corresponding to each word in each text line, perform optical character recognition on the image to be processed, and determine text lines in the image to be processed and the position information of each word in each text line.

In yet another possible design of the second aspect, the determining module is further configured to: determine a range of each field in each text line according to the text recognition result of the image to be processed, where each field includes multiple words of which context semantic information is related to each other; and determine actual meaning of text in the image to be processed according to the context semantic information of all words in a same field in each text line.

The apparatus provided in the second aspect of the present application can be used to execute the method provided in the first aspect. The implementation principles and technical effects are similar, and details are not repeated here.

In a third aspect, the present application provides an electronic device, including:

at least one processor; and a memory communicatively connected to the at least one processor; where, the memory stores instructions executable by the at least one processor, and the instructions are executed by the at least one processor, so that the at least one processor is capable of executing the methods according to the first aspect and the possible designs of the first aspect.

In a fourth aspect, the present application provides a non-transitory computer-readable storage medium, having computer instructions stored thereon, where the computer instructions are used to enable a computer to execute the methods according to the first aspect and the possible designs of the first aspect.

In a fifth aspect, the present application provides a method for image text recognition, including:

determining a composite encoded vector of each word in at least one text line of an image to be processed, where the composite encoded vector carries semantic information and position information; and processing the composite encoded vector corresponding to each word in each text line to obtain a text recognition result of the image to be processed.

One of the above embodiments in the application has the following advantages or beneficial effects: the image to be processed is acquired, where at least one text line exists in the image to be processed; each text line in the image to be processed is processed to obtain the composite encoded vector corresponding to each word in each text line, where the composite encoded vector carries the semantic information and the position information; and the text recognition result of the image to be processed is determined according to the semantic information and the position information carried in the composite encoded vector corresponding to each word in each text line. In this technical solution, not only are the semantic features of the text used, but also the position information of the text on the image is fused, which can accurately distinguish adjacent fields with small pixel spacing in the image and improve the accuracy of text recognition in the image.

Other effects of the above optional manners will be described below in combination with specific embodiments.

BRIEF DESCRIPTION OF THE DRAWINGS

The drawings are used to better understand the solutions, and do not constitute a limitation on the application, where:

FIG. 5 is a schematic diagram of processing a word in a text line;

FIG. 6 is a schematic flowchart of a method for image text recognition according to a fourth embodiment of the present application;

FIG. 7 is a schematic diagram of a patient expense list of a hospital;

FIG. 8 is a schematic diagram of a text detection result for the patient expense list shown in FIG. 7;

DETAILED DESCRIPTION OF THE EMBODIMENTS

Figure 1:
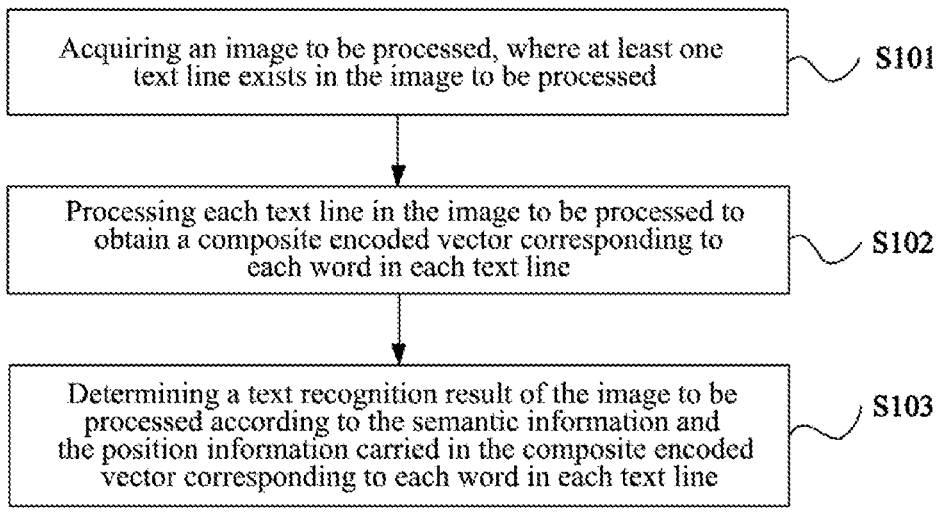
FIG. 1 is a schematic flowchart of a method for image text recognition according to a first embodiment of the present application.

Exemplary embodiments of the present application are described below with reference to the accompanying drawings, which include various details of the embodiments of the present application to facilitate understanding, and should be considered as merely exemplary. Therefore, those of ordinary skill in the art should recognize that various changes and modifications can be made to the embodiments described herein without departing from the scope and spirit of the application. Similarly, for clarity and conciseness, descriptions of well-known functions and structures are omitted in the following description.

Optical character recognition (OCR) refers to the process of analyzing and recognizing image documents of text materials to obtain text and layout information. That is, the text in an image is recognized and returned in the form of text. A typical OCR technical solution can be divided into two parts: text detection and text recognition. The text detection is to detect the location, range, and layout of text in an image, and usually also includes layout analysis and text line detection, etc. The text detection mainly determines which position of the image has text and how large the range of the text is. The text recognition is to recognize text content based on the text detection and transform text content in the image into text information. The text recognition mainly determines what each word detected by the text detection is.

For a text detection task, an image detection method is mainly applied to select a text area in an image. Faster R-CNN algorithm is commonly used, which adopts region proposal network (RPN) for assisting generating samples to divide the algorithm structure into two parts. First, the RPN is used to judge whether a candidate box is the target box, and then a multi-task loss function for classification and localization is used to judge the type of the target box. The entire network process can share the feature information extracted by the convolutional neural network, which saves the calculation cost, and solves the problem that the Fast R-CNN algorithm generates candidate boxes with positive and negative samples slowly, and at the same time, avoids the decrease of accuracy rate caused by excessive extraction of candidate boxes. For text detection in limited scenes, the Faster R-CNN algorithm performs better, and can determine text areas with different granularities through multiple detections.

However, although the above method can solve the problem of text detection in OCR to a certain extent, since the detection method completely depends on the semantic feature information of the image, it can only distinguish text lines that have obvious differences in image features. However, in the actual application process, after the image recognition, it is usually necessary to segment the consecutive text of the image representation layer at the text semantic level to distinguish the semantic difference between different fields. In view of this problem, in the related art, a manner of artificially extracting rules to segment the fields according to the features of text expressions is mainly used. The tedious and complicated formulating process for artificially extracting rules is time-consuming and inflexible, and there may be problems of interaction between different strategies.

In summary, the text detection process of the OCR method in the prior art is completely dependent on the semantic information of the image, and adjacent fields with small pixel spacing in the image cannot be distinguished, resulting in low recognition accuracy. Therefore, embodiments of the application provide a method for image text recognition, in which an image to be processed is acquired, where at least one text line exists in the image to be processed; each text line in the image to be processed is processed to obtain a composite encoded vector corresponding to each word in each text line, where the composite encoded vector carries semantic information and position information; and a text recognition result of the image to be processed is determined according to the semantic information and the position information carried in the composite encoded vector corresponding to each word in each text line. In this technical solution, not only are the semantic features of the text used, but also the position information of the text on the image is fused, which can accurately distinguish adjacent fields with small pixel spacing in the image and improve the accuracy of text recognition in the image.

It can be understood that the executive entity of the embodiments of the present application may be an electronic device, for example, a terminal device such as a computer, a tablet computer, or may be a server, for example, a background processing platform. Therefore, in the embodiments, the terminal device and the server are collectively referred to as an electronic device for explanation, and as for whether the electronic device is specifically a terminal device or a server can be determined according to actual conditions.

In the following, the technical solutions of the present application will be described in detail through specific embodiments. It should be noted that the following specific embodiments may be combined with each other, and the same or similar concepts or processes may not be repeated in some embodiments.

FIG. 1 is a schematic flowchart of a method for image text recognition according to a first embodiment of the present application. As shown in FIG. 1, the method can include the following steps:

S101: acquiring an image to be processed, where at least one text line exists in the image to be processed.

In practical applications, image text recognition has been widely used in the fields of virtual reality, human-computer interaction, bill recognition, and industrial automation, etc. For example, by recognizing a bill, the information in the bill can be determined, helping relevant personnel to collect and process the bill electronically.

In this embodiment, when an electronic device needs to perform an image text recognition operation, first, an image to be processed which has text in the image is acquired. The image to be processed may be an image with text which is preset in the electronic device, or may be an image to be processed which is independent of the electronic device. The embodiments of the present application do not limit the manner of acquiring the image to be processed, which can be determined according to actual needs.

It can be understood that at least one text line needs to exist in the image to be processed, so that the electronic device can accurately recognize each field in each text line using the method for image text recognition of this embodiment, thereby determining the actual meaning of the text in the image.

S102: processing each text line in the image to be processed to obtain a composite encoded vector corresponding to each word in each text line.

The composite encoded vector carries semantic information and position information.

Exemplarily, in this embodiment, a self-attention & positional encoding layer can be set in the electronic device. Specifically, a self-attention mechanism of the self-attention & positional encoding layer is used to process each text line in the image to be processed, and the semantic information of each word is determined by encoding context semantic information of each word; a positional encoding mechanism of the positional encoding layer is used to encode the position information of each word in each text line, and the position information of each word is determined; and finally the semantic information and the position information of each word is fused to obtain the composite encoded vector corresponding to each word in each text line.

For the implementation principle of this step, reference may be made to the description in the embodiment shown in FIG. 2 below, and details are not repeated here.

It can be understood that, in the embodiment of the present application, before this step, the method can further include the following steps:

performing optical character recognition on the image to be processed, and determining text lines in the image to be processed and the position information of each word in each text line.

In practical applications, after acquiring the image to be processed, it is usually necessary to first judge whether there is text in the image to be processed and where the text is located when there is text in the image to be processed. In this embodiment, text detection and text recognition can be performed on the image to be processed by a method of optical character recognition (ORC).

Specifically, first, the image to be processed is scanned to determine the existence of text lines in the image to be processed and the location, range and layout of the text lines, and then text detection is performed on each text line to determine the specific meaning of each word.

S103: determining a text recognition result of the image to be processed according to the semantic information and the position information carried in the composite encoded vector corresponding to each word in each text line.

In this embodiment, since the composite encoded vector corresponding to each word in the text line has the fused semantic information and position information, the composite encoded vector outputted at each position in the image to be processed simultaneously represents the semantic information and the position information. When the composite encoded vector is inputted into a discriminant model to undergo entity sequence label classification, an accurate classification result of sequence label can be obtained; and then coordinate ranges of all words of the same entity field are aggregated according to the obtained classification results of sequence label, so that the text recognition result of the image to be processed can be determined.

For the implementation principle of this step, reference may be made to the description in the embodiment shown in FIG. 4 below, and details are not repeated here.

In the method for image text recognition provided in the embodiment of the present application, the image to be processed is acquired, where at least one text line exists in the image to be processed; each text line in the image to be processed is processed to obtain the composite encoded vector corresponding to each word in each text line, where the composite encoded vector carries the semantic information and the position information; and the text recognition result of the image to be processed is determined according to the semantic information and the position information carried in the composite encoded vector corresponding to each word in each text line. In this technical solution, not only are the semantic features of the text used, but also the position information of the text on the image is fused, which can accurately distinguish adjacent fields with small pixel spacing in the image and improve the accuracy of text recognition in the image.

Figure 2:
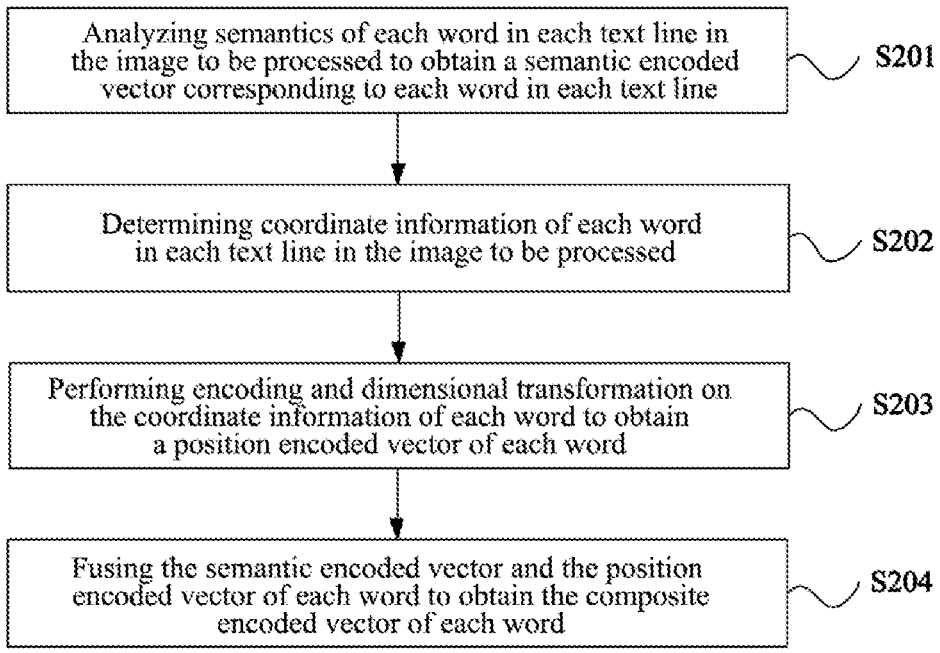
FIG. 2 is a schematic flowchart of a method for image text recognition according to a second embodiment of the present application.

Exemplarily, on the basis of the above embodiment, FIG. 2 is a schematic flowchart of a method for image text recognition according to a second embodiment of the present application. As shown in FIG. 2, in this embodiment, the above S102 can be realized by the following steps:

S201: analyzing semantics of each word in each text line in the image to be processed to obtain a semantic encoded vector corresponding to each word in each text line.

In this embodiment, for each text line in the image to be processed, each word in the image is first semantically enhanced separately to obtain an enhanced semantic vector; then each word is used as an object, for example, a Query in a database, and the semantic encoded vector corresponding to the each word is obtained by weighting and fusing semantic information of all words in the text line where the word is located.

Exemplarily, for each word, the semantic encoded vector obtained after weighting and fusing can be represented by a 768-dimensional vector.

Therefore, in this embodiment, this step can be summarized as being realized by follow steps: for each word in the image to be processed, weighting and fusing the semantic information of all words in the text line to which the word belongs to obtain the semantic encoded vector of the word.

S202: determining coordinate information of each word in each text line in the image to be processed.

In this embodiment, after the image to be processed is subjected to optical character recognition, the position coordinates of each word in each text line in the image to be processed can be obtained, thereby the coordinate information of each word in each text line in the image to be processed can be determined.

S203: performing encoding and dimensional transformation on the coordinate information of each word to obtain a position encoded vector of each word.

The dimension of the position encoded vector is same as that of the semantic encoded vector.

In this embodiment, after obtaining the coordinate information of each word in the image to be processed, multiple pixel points representing the word can be determined, and the coordinate information of the multiple pixel points is used to form a position vector to represent the word.

Exemplarily, a top left corner point, a center point, and a down right corner point of each word are used as the pixel points of the word, therefore, the coordinates of the top left corner point, the coordinates of the center point, and the coordinates of the down right corner point of each word can be used to form a 6-dimensional vector to obtain the position vector of the word.

Further, in this embodiment, dimensional transformation can be performed on the position vector of each word to obtain a position encoded vector having the same dimension as the above semantic encoded vector. Exemplarily, the position vector of the word is mapped to a 768-dimensional vector using a fully connected layer, which thus has the same dimensions as the above semantic encoded vector, so that the position encoded vector and the semantic encoded vector can be added together to obtain the composite encoded vector of each word.

Therefore, in the embodiment of the present application, S203 can be realized by the following steps:

A1: determining multiple pixel points representing each word in the image to be processed.

Optionally, in the image to be processed, each word occupies a certain space, that is, each word is composed of multiple pixel points. In this embodiment, in order to accurately represent the position information of the word, the coordinate information of the multiple pixel points constituting the word can be used for representing. Specifically, since the center point, the top left corner point, the down right corner point, a top right corner point, and a down left corner point of each word are all the key pixel points of the word, therefore selection can be performed from the above center point, top left corner point, down right corner point, top right corner point and down left corner point.

A2: determining a position vector of each word according to coordinate information of the multiple pixel points corresponding to each word.

Exemplarily, in order to simplify the processing complexity and accurately represent the position of the word, in this embodiment, the center point, the top left corner point, and the down right corner point of each word can be used as key pixel points. In this way, using the coordinates of the center point, the coordinates of the top left corner point, and the coordinates of the down right corner point of each word, the relative distances of each two of the three pixel points can be obtained respectively, thereby the three groups of relative distances can form a 6-dimensional position vector, and the 6-dimensional position vector is the position vector of the word.

A3: performing dimensional transformation on the position vector of each word according to the dimension of the semantic encoded vector corresponding to each word to obtain a position encoded vector having the same dimension as the semantic encoded vector.

In this embodiment, since the semantic encoded vector obtained after semantic analysis of each word in a text line is a high-dimensional vector, in order to fuse the semantic information and the position information of the word, in this embodiment, it is necessary to perform dimensional transformation on the position vector of each word according to the dimension of the semantic encoded vector corresponding to each word to transform the position vector of each word into the position encoded vector having the same dimension as the semantic encoded vector.

S204: fusing the semantic encoded vector and the position encoded vector of each word to obtain the composite encoded vector of each word.

In this embodiment, after obtaining the semantic encoded vector and the position encoded vector corresponding to each word, since the position encoded vector and the semantic encoded vector of each word have the same dimension, the semantic encoded vector and the position encoded vector of each word are fused by the principle of same position superposition, and the fused vector is used as the composite encoded vector of each word.

In this embodiment, since the semantic encoded vector of each word is obtained by weighting and fusing the semantic information of all the words in the text line to which the word belongs, and the position encoded vector of each word is obtained by performing encoding and dimensional transformation on the coordinate information of the word, the composite encoded vector of each word carries accurate semantic information and position information.

Figure 3:
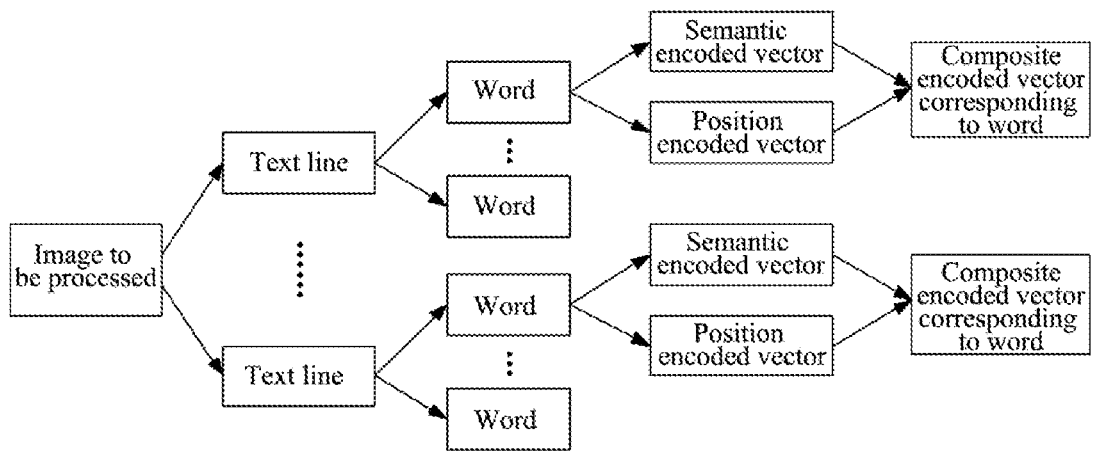
FIG. 3 is a schematic diagram of processing an image to be processed to obtain a composite encoded vector of each word.

Exemplarily, FIG. 3 is a schematic diagram of processing an image to be processed to obtain a composite encoded vector of each word. As shown in FIG. 3, in this embodiment, the image to be processed is first subjected to optical character recognition, and at least one text line in the image to be processed is determined; then each word in each text line is subjected to semantic analysis to obtain the semantic encoded vector corresponding to each word, and the position encoded vector of each word is obtained based on the coordinate information of each word; finally, the semantic encoded vector and the position encoded vector of each word are fused to obtain the composite encoded vector of each word.

In the method for image text recognition provided in the embodiment of the present application, the semantic of each word in each text line in the image to be processed is analyzed to obtain the semantic encoded vector corresponding to each word in each text line; then the coordinate information of each word in each text line in the image to be processed is determined; encoding and dimensional transformation is performed on the coordinate information of each word to obtain the position encoded vector of each word, where the dimension of the position encoded vector is the same as that of the semantic encoded vector; and finally the semantic encoded vector and the position encoded vector of each word are fused to obtain the composite encoded vector of each word. In this technical solution, the composite encoded vector of each word is obtained by fusing the semantic encoded vector and the position encoded vector of each word, and carries accurate semantic information and position information, therefore the words belonging to different fields in a certain type of area (such as a table area) which have no obvious semantic difference (such as multiple consecutive numeric columns) can be accurately divided, thereby improving the accuracy rate of subsequent image text recognition.

Figure 4:
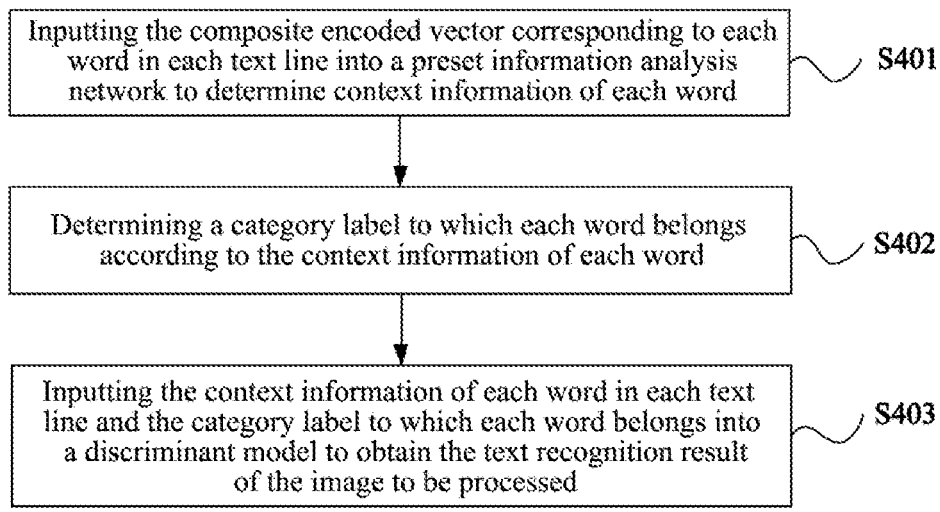
FIG. 4 is a schematic flowchart of a method for image text recognition according to a third embodiment of the present application.

Exemplarily, on the basis of the above embodiment, FIG. 4 is a schematic flowchart of a method for image text recognition according to a third embodiment of the present application. As shown in FIG. 4, in this embodiment, the above S103 can be realized by the following steps:

S401: inputting the composite encoded vector corresponding to each word in each text line into a preset information analysis network to determine context information of each word.

The preset information analysis network is used to analyze the context information of each word.

Exemplarily, the preset information analysis network may be realized by a bidirectional long short-term memory (Bi-LSTM) network. The Bi-LSTM network includes a forward LSTM network and a backward LSTM network. The forward LSTM network is used to analyze pre-text information of the current word, and the backward LSTM network is used to analyze post-text information of the current word.

Specifically, in this embodiment, the pre-text information and the post-text information of the current word are encoded by the forward LSTM and the backward LSTM respectively, and the context information of each word can be determined by splicing the output results of the forward LSTM and the backward LSTM.

Specifically, for a word $x_i$ (i is a positive integer), the semantic recognition results of (i−1) words before the word $x_i$ are used as the pre-text information of the word $x_i$, and the semantic recognition results of words after the word $x_i$ are used as the post-text information of the word $x_i$. Optionally, for the word $x_i$, the pre-text information of the word $x_i$ is encoded through the forward LSTM, and a pre-text output result of the word $x_i$ is recorded as $\vec{h_i}$; similarly, for the word $x_i$, the post-text information of the word $x_i$ is encoded through the backward LSTM, and a post-text output result of the word $x_i$ is recorded as $\overleftarrow{h_t}$; the pre-text output result $\vec{h_i}$ and the post-text output result $\overleftarrow{h_t}$ of the word $x_i$ are spliced at a vector level to obtain a bidirectional LSTM output result $p_i$ of the word $x_i$, and the dimension of the output result $p_i$ is two times that of the pre-text output result $\vec{h_i}$ and the post-text output result $\overleftarrow{h_t}$.

Exemplarily, FIG. 5 is a schematic diagram of processing a word in a text line. As shown in FIG. 5, in this embodiment, "中 国 很 大" ("China is very big") detected by optical character recognition is used as a text line to be processed, and the words in the text line and their position refer to FIG. 5. Specifically, the composite encoded vector corresponding to "中" is $x_1$, the composite encoded vector corresponding to "国" is $x_2$, the composite encoded vector corresponding to "很" is $x_3$, and the composite encoded vector corresponding to "大" is $x_4$. The composite encoded vector $x_1$ is inputted into the bidirectional LSTM, the output result of the forward LSTM is $\vec{h_1}$, the output result of the backward LSTM is $\overleftarrow{h_1}$, and the output result $\vec{h_1}$ and the output result $\overleftarrow{h_1}$ are superimposed to obtain $p_1$ as the output result of the bidirectional LSTM. That is, a vector corresponding to the context information of the word "中" is $p_1$.

Similarly, a vector corresponding to the context information of the word "国" is $p_2$, a vector corresponding to the context information of "很" is $p_3$, and a vector corresponding to the context information of "大" is $p_4$. The processing of other words in this embodiment is similar and will not be repeated here.

S402: determining a category label to which each word belongs according to the context information of each word.

In this embodiment, the vector corresponding to the context information of each word can be subjected to a layer of linear transformation to obtain a score of the word belonging to each category label, that is, through the linear transformation layer, the bidirectional LSTM output result of each word is transformed into a vector whose dimension is the same as the number of category labels, so that the category label to which each word belongs is determined.

S403: inputting the context information of each word in each text line and the category label to which each word belongs into a discriminant model to obtain the text recognition result of the image to be processed.

Optionally, the discriminant model is a conditional random field (CRF). In this embodiment, an optimal entity label sequence can be obtained according to the context information of each word outputted by the bidirectional LSTM, the category label to which each word belongs, and a transition score matrix of the conditional random field.

In this embodiment, the main function of the CRF is to learn a state transition score matrix, and some constraints can be added to ensure that the final prediction result is valid. For example, the beginning of a sentence should be "B-" or "O", rather than "I-" or "E-"; "O I-label" is wrong, and the beginning of a named entity should be "B-" instead of "I-", etc.

It can be understood that in the embodiment of the present application, a text structured task can be executed for a table area, and the text in at least one text line and the coordinate information are obtained through universal OCR detection and recognition.

For the text in the same line, secondary processing is performed thereon in this embodiment to segment multiple fields with small pixel distances. Using a deep learning method, a field segmentation task is transformed into a common task of named entity recognition in natural language processing, and fields in each column are regarded as one kind of entities; with the manner of "B-entity name" (that is, representing the word is the beginning word of an entity), "I-entity name" (that is, representing the word is the middle word of an entity), "E-entity name" (that is, representing the word is the ending word of an entity), "S-entity name" (that is, representing the word is a single word entity), "0" (that is, representing the word does not constitute an entity), a predicted output of sequence label is made on the same line of table text. According to the prediction result of sequence label, the range of the text belonging to the same entity can be known, and by aggregating the word coordinates of the same entity, a text detection box corresponding to the field may be regenerated.

Exemplarily, referring to FIG. 5, in the text recognition result corresponding to the above text line "中 国 很 大", "中" corresponds to "B-LOC", "国" corresponds to "I-LOC", both "很" and "大" correspond to "O".

In the method for image text recognition provided in the embodiment of the present application, the composite encoded vector corresponding to each word in each text line is inputted into the preset information analysis network to determine the context information of each word; the category label to which each word belongs is determined according to the context information of each word; and the context information of each word in each text line and the category label to which each word belongs are inputted into the discriminant model to obtain the text recognition result of the image to be processed. In this technical solution, by determining the context information of each word and the category to which each word belongs, and then using the discriminant model to classify the category label, the fields in the text line can be segmented effectively, which lays a foundation for subsequently obtaining an accurate text recognition result.

Further, in the embodiments of the present application, FIG. 6 is a schematic flowchart of a method for image text recognition according to a fourth embodiment of the present application. As shown in FIG. 6, the method can further include the following steps:

S601: determining a range of each field in each text line according to the text recognition result of the image to be processed, where each field includes multiple words of which context semantic information is related to each other.

Exemplarily, this step may be executed after the above S103, that is, the fields in each text line are divided according to the obtained text recognition result of the image to be processed. Exemplarily, the range of each field can be determined based on the category entity label carried by each word, so that the context semantic information of multiple words included in each field is related.

S602: determining actual meaning of text in the image to be processed according to context semantic information of all words in the same field in each text line.

In this embodiment, each text line can be segmented according to the range of each field, which realizes accurate sentence breaking to determine the actual meaning of the text in the image to be processed, and brings great convenience for the subsequent OCR text structured work.

In the method for image text recognition in the embodiment of the present application, the range of each field in each text line is determined according to the text recognition result of the image to be processed, where each field includes multiple words of which the context semantic information is related to each other; and the actual meaning of the text in the image to be processed is determined according to the context semantic information of all the words in the same field in each text line, which can assist in performing a subsequent structural task of the text in the image.

In summary, in the embodiment of the present application, after obtaining the OCR detection and recognition results, second processing is performed to encode each word of the text line, so that the context semantic information is fully fused for each word; and position encoding is performed on position information of the detection box of each word, which is fused with the semantic information, so that the output vector of each position simultaneously represents the semantic information and the position information. The bidirectional LSTM network is connected at the upper layer to encode the context information; the sequence label output is made by being connected to the CRF; the range of each entity field can be obtained according to the sequence label result of the entity type; and finally a new detection box is generated by re-aggregating the coordinate ranges of all words of the same entity field so as to complete the field segmentation task based on text semantic and position encoding.

In the following, an embodiment of the present application illustrates a text structured task of a table area for a detailed list issued by a hospital. Since a table area of an image in the real scene often has a problem of small spacing between multiple columns, and the text detection process is completely dependent on the semantic information of the image, consecutive text that has a difference in semantics but has no obvious feature in the image position cannot be distinguished, thereby resulting in that it is difficult to distinguish multiple fields with small pixel spacing during the OCR detection. Using the method in the embodiment of the present application, the OCR results can be segmented according to the semantics of the text and the position of the text on the image, which brings great convenience for the subsequent OCR text structured work.

Exemplarily, FIG. 7 is a schematic diagram of a patient expense list of a hospital. As shown in FIG. 7, for an area selected by the dashed thick line box, since the distances between adjacent columns are close, there is no obvious feature on the image to distinguish different fields. Therefore, exemplarily, the existing OCR will usually detect the two fields of "16 层未知" ("unknown 16 layers") and "块" ("block") as one field, and detect the two fields of "2.1100" and "4" as one field. In this embodiment, secondary processing is mainly performed on the OCR detection and recognition results, thereby achieving the effect of distinguishing different fields.

In this embodiment, the OCR method can be used to recognize a text line in the schematic diagram of the patient expense list, and the coordinate position of each word in the text line in the original image and the recognition result of each field in the text line. Exemplarily, FIG. 8 is a schematic diagram of a text detection result of the patient expense list shown in FIG. 7. As shown in FIG. 8, a text line of "敷料（抽丝纱布）16层未知 块 2.1100 4 8.4400 8.4400" ("dressing (spinning gauze) unknown 16 layers block 2.1100 4 8.4400 8.4400") is taken as an example for illustration.

Figure 9:
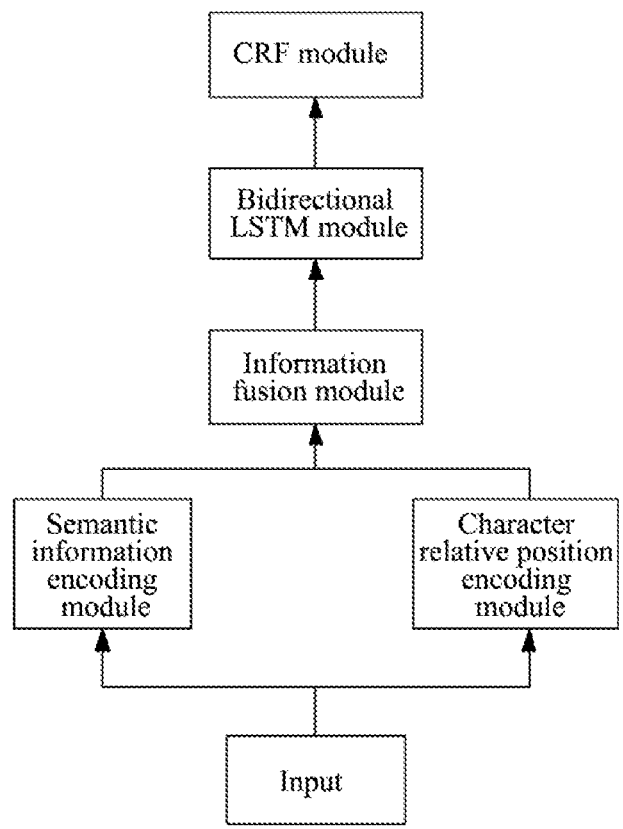
FIG. 9 is a block diagram of image text recognition performed by an electronic device according to an embodiment of the present application.

Exemplarily, FIG. 9 is a block diagram of image text recognition performed by an electronic device according to an embodiment of the present application. As shown in FIG. 9, in this embodiment, the electronic device includes: a semantic information encoding module, a character relative position encoding module, an information fusion module, a bidirectional LSTM module and a CRF module. In this embodiment, the input of the electronic device is each word in the text line and the coordinate position of the word in the original image. The coordinate position of each word in the text line is as follows:

```
{    "word": "敷",
     "rect":{     "width": 28,
                  "top": 1242,
                  "left": 461,
                  "height": 50
            }
},
{    "word": "料",
     "rect": {    "width": 39,
                  "top": 1242,
                  "left": 493,
                  "height": 50
            }
},... (due to the length, other word information is omitted)
```

In this embodiment, the semantic information encoding module extracts "word", that is, each word, from the input, learns the context semantics through a self-attention model, and finally outputs a semantic encoded vector corresponding to each word.

The character relative position encoding module extracts "rect", that is, the coordinate information of each word, from the input. The relative distances of the word coordinates of the top left corner point, the center point and the down right corner point of adjacent words are calculated through a character relative position calculation module. Taking the solving of the relative distance regarding the word coordinate of the top left corner point "料" as an example, the left relative distance is the left of "料" minus the left of "敷": 493−461=32, similarly, the top relative distance is 1242−1242=0, similarly, the relative distance regarding the center point and the down right corner point can be obtained. By splicing three distances, a 6-dimensional vector can be obtained. In this embodiment, in order to ensure that the relative position encoding information can be fused with the text semantic information encoded by the semantic information encoding module, the 6-dimensional vector is mapped to have the same dimension as the semantic encoded vector through a fully connected layer.

The information fusion module, that is, a semantic information and relative position fusion module, uses the semantic encoded vector of each word obtained by the semantic information encoding module and the position encoded vector obtained by the character relative position encoding module. The two vectors are added bit by bit for information fusion, and the composite encoded vector is obtained.

The bidirectional LSTM module fully learns the inputted composite encoded vector and determines the context information of each word and the category label to which each word belongs, and then inputs them into the CRF module to obtain the output result corresponding to each word.

Figure 10:
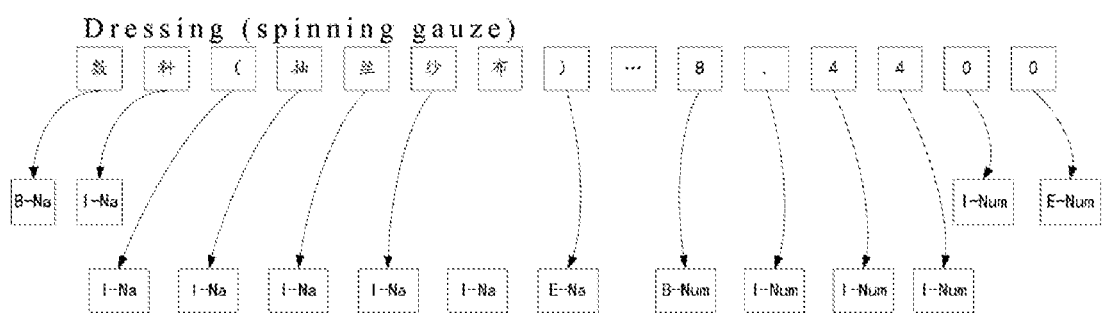
FIG. 10 is a schematic diagram of a recognition result of the patient expense list shown in FIG. 7.

Exemplarily, FIG. 10 is a schematic diagram of a recognition result of the patient expense list shown in FIG. 7. As shown in FIG. 10, taking "敷料(抽丝纱布) 16 层未知 块 2.1100 4 8.4400" as an example, the obtained output sequence is "B-Na I-Na I-Na I-Na I-Na I-Na I-Na E-Na B-Spec I-Spec I-Spec I-Spec E-Spec S-Un B-Num I-Num I-Num I-Num I-Num E-Num S-Num B-Num I-Num I-Num I-Num E-Num", where Na represents a name entity, Spec represents a specification entity, Un represents a unit entity, Num represents a number entity, B is the beginning of an entity, I represents the middle of an entity, E represents the ending of an entity, and S represents a single word entity. Finally, the output sequence is aggregated, and the final segmentation result of the fields is " 敷料(抽丝纱布) 16层 未知   块 2.1100 4 8.4400".

In the method for image text recognition proposed in the embodiment of the present application, the text and position information are encoded and fused, and the relationship between semantics and position is automatically determined, so that the fields with larger pixel distances at an image level can be distinguished according to the position encoding, and different fields which are close in distance but have an obvious semantic difference can be distinguished according to the text semantic encoding, which brings great convenience for the subsequent table text content structured.

The above describes the specific implementations of the method for image text recognition mentioned in the embodiments of the present application. The following are apparatus embodiments of the present application, which can be used to execute the method embodiments of the present application. For details not disclosed in the apparatus embodiments of the present application, please refer to the method embodiments of the present application.

Figure 11:
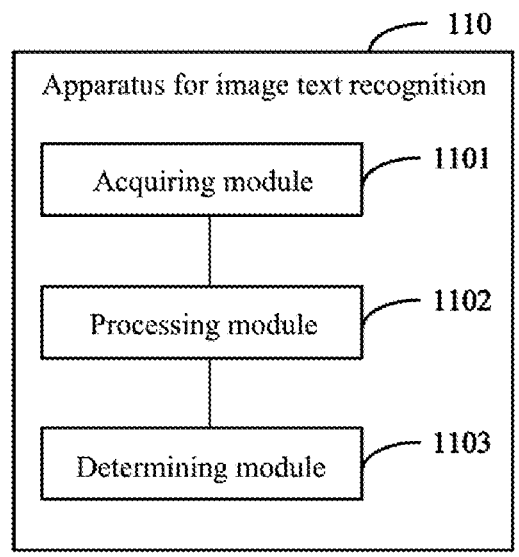
FIG. 11 is a schematic structural diagram of an apparatus for image text recognition according to an embodiment of the present application.

FIG. 11 is a schematic structural diagram of an apparatus for image text recognition according to an embodiment of the present application. The apparatus may be integrated in or realized by an electronic device, and the electronic device may be a terminal device or a server. As shown in FIG. 11, in this embodiment, the apparatus for image text recognition 110 can include an acquiring module 1101, a processing module 1102, and a determining module 1103.

The acquiring module 1101 is configured to acquire an image to be processed, where at least one text line exists in the image to be processed;

the processing module 1102 is configured to process each text line in the image to be processed to obtain a composite encoded vector corresponding to each word in each text line, where the composite encoded vector carries semantic information and position information; and the determining module 1103 is configured to determine a text recognition result of the image to be processed according to the semantic information and the position information carried in the composite encoded vector corresponding to each word in each text line.

In a possible design of the embodiment of the present application, the processing module 1102 is specifically configured to: analyze semantics of each word in each text line in the image to be processed to obtain a semantic encoded vector corresponding to each word in each text line; determine coordinate information of each word in each text line in the image to be processed; perform encoding and dimensional transformation on the coordinate information of each word to obtain a position encoded vector of each word, where a dimension of the position encoded vector is the same as that of the semantic encoded vector; and fuse the semantic encoded vector and the position encoded vector of each word to obtain the composite encoded vector of each word.

In the embodiment of the present application, that the processing module 1102 is configured to analyze semantics of each word in each text line in the image to be processed to obtain a semantic encoded vector corresponding to each word in each text line, is specifically that:

the processing module 1102 is specifically configured to: for each word in the image to be processed, weight and fuse semantic information of all words in the text line to which the each word belongs to obtain the semantic encoded vector of the each word.

In the embodiment of the present application, that the processing module 1102 is configured to perform encoding and dimensional transformation on the coordinate information of each word to obtain a position encoded vector of each word, is specifically that:

the processing module 1102 is specifically configured to: determine multiple pixel points representing each word in the image to be processed; determine a position vector of each word according to coordinate information of the multiple pixel points corresponding to each word; and perform dimensional transformation on the position vector of each word according to the dimension of the semantic encoded vector corresponding to each word to obtain the position encoded vector having the same dimension as the semantic encoded vector.

In another possible design of the embodiment of the present application, the determining module 1103 is specifically configured to: input the composite encoded vector corresponding to each word in each text line into a preset information analysis network to determine context information of each word, where the preset information analysis network is used to analyze the context information of each word; determine a category label to which each word belongs according to the context information of each word; and input the context information of each word in each text line and the category label to which each word belongs into a discriminant model to obtain the text recognition result of the image to be processed.

In still another possible design of the embodiment of the present application, the processing module 1102 is further configured to: before processing each text line in the image to be processed to obtain the composite encoded vector corresponding to each word in each text line, perform optical character recognition on the image to be processed, and determine text lines in the image to be processed and the position information of each word in each text line.

In yet another possible design of the embodiment of the present application, the determining module 1103 is further configured to: determine a range of each field in each text line according to the text recognition result of the image to be processed, where each field includes multiple words of which context semantic information is related to each other; and determine actual meaning of text in the image to be processed according to the context semantic information of all words in the same field in each text line.

The apparatus provided in the embodiment of the present application can be used to execute the method in the embodiments shown in FIG. 1 to FIG. 10. The implementation principles and technical effects are similar, and details are not repeated here.

It should be noted that the division of modules of the above apparatus is only a division of logical functions, and in actual implementations, all or part of the modules may be integrated into a physical entity, or may be physically separated. These modules can all be realized in the form of software being called by processing elements; they can also all be realized in the form of hardware; or part of the modules can be realized in the form of software being called by processing elements, and part of the modules can be realized in the form of hardware. For example, the determining module may be a separately disposed processing element; or may be realized by being integrated in a chip of the above apparatus; in addition, it may also be stored in the memory of the above apparatus in the form of program code, and called by a certain processing element of the above apparatus to execute the functions of the above determining module. The realization of other modules is similar to this. In addition, all or part of these modules can be integrated together, or they can be realized independently. The processing element described here may be an integrated circuit with signal processing capabilities. In the implementation process, each step of the above method or each of the above modules may be completed by an integrated logic circuit of hardware in a processor element or instructions in the form of software.

For example, the above modules may be one or more integrated circuits configured to implement the above methods, for example: one or more application specific integrated circuits (ASICs), or, one or more digital signal processors, (DSPs), or, one or more field programmable gate arrays (FPGAs), etc. For another example, when one of the above modules is realized in the form of a processing element scheduling program code, the processing element may be a general-purpose processor, such as a central processing unit (CPU) or other processors that can call program code. For another example, these modules may be integrated together and realized in the form of a system-on-a-chip (SOC).

The above embodiments may be realized in whole or in part by software, hardware, firmware, or any combination of them. When realized in software, they may be realized in whole or in part in the form of a computer program product. The computer program product includes one or more computer instructions. When the computer program instructions are loaded and executed on a computer, the processes or functions according to the embodiments of the present application are wholly or partially generated. The computer may be a general-purpose computer, a special-purpose computer, a computer network, or other programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center by wire (such as a coaxial cable, an optical fiber, a digital subscriber line (DSL)) or wirelessly (such as by infrared, wirelessly, by microwave, etc.). The computer-readable storage medium may be any available medium that can be accessed by a computer or a data storage device such as a server, a data center, or the like that is integrated by one or more available media. The available medium may be a magnetic medium (for example, a floppy disk, a hard disk, a magnetic tape), an optical medium (for example, a DVD), or a semiconductor medium (for example, a solid state disk (SSD)), etc.

Further, according to an embodiment of the present application, the present application further provides an electronic device and a readable storage medium.

Figure 12:
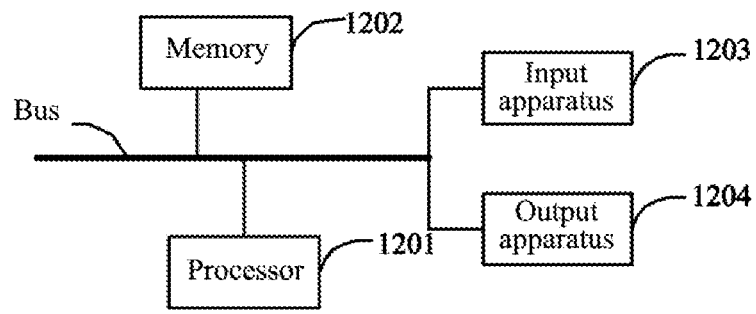
FIG. 12 is a block diagram of an electronic device for realizing a method for image text recognition according to an embodiment of the present application.

FIG. 12 is a block diagram of an electronic device for realizing a method for image text recognition according to an embodiment of the present application. An electronic device is intended to represent various forms of digital computers, such as laptop computers, desktop computers, workbenches, personal digital assistants, servers, blade servers, mainframe computers, and other suitable computers. The electronic device may also represent various forms of mobile apparatus, such as personal digital assistants, cellular phones, smart phones, wearable devices, and other similar computing apparatus. The components, their connections and relationships, and their functions shown herein are merely used as examples, and are not intended to be limited to the implementations of the application described and/or required here.

As shown in FIG. 12, the electronic device includes: one or more processors 1201, a memory 1202, and interfaces for connecting components, including a high-speed interface and a low-speed interface. The components are interconnected using different buses and can be installed on a public motherboard or in other installation manners as required. The processor can process instructions executed within the electronic device, including instructions stored in or on the memory for displaying graphical information of a GUI on an external input/output apparatus (such as, a display device coupled to the interface). In other implementations, multiple processors and/or multiple buses may be used with multiple memories, if required. Similarly, multiple electronic devices may be connected, and each device provides part of the necessary operations (for example, as a server array, a group of blade servers, or a multiprocessor system). One processor 1201 is taken as an example in FIG. 12.

The memory 1202 is a non-transitory computer-readable storage medium provided by the present application. The memory stores instructions that can be executed by at least one processor, so that the at least one processor executes the method for image text recognition provided by the present application. The non-transitory computer-readable storage medium of the present application stores computer instructions, which are used to enable a computer to execute the method for image text recognition provided by the present application.

As a non-transitory computer-readable storage medium, the memory 1202 may be used to store non-transitory software programs, non-transitory computer-executable programs and modules, such as program instructions/modules corresponding to the method for image text recognition in the embodiments of the present application (for example, the acquiring module 1101, the processing module 1102, and the determining module 1103 shown in FIG. 11). The processor 1101 executes various functional applications and data processing of the server by running the non-transitory software programs, instructions and modules stored in the memory 1102, that is, to implement the method for image text recognition in the above method embodiments.

The memory 1202 may include a program storage area and a data storage area, where the program storage area may store an operating system and an application program required for at least one function; the data storage area may store data created according to the use of an electronic device for image text recognition, and the like. In addition, the memory 1202 may include a high-speed random access memory, and may further include a non-transitory memory, for example at least one magnetic disk storage device, a flash memory device, or other non-transitory solid-state storage device. In some embodiments, the memory 1202 may optionally include memories that are remotely disposed relative to the processor 1201, and these remote memories may be connected to the electronic device for image text recognition through a network. Examples of the above network include, but are not limited to, the Internet, an intranet, a local area network, a mobile communication network, and their combinations.

The electronic device for image text recognition may further include: an input apparatus 1203 and an output apparatus 1204. The processor 1201, the memory 1202, the input apparatus 1203 and the output apparatus 1204 may be connected through a bus or other manners. Connection through a bus is taken as an example in FIG. 12.

The input apparatus 1203 may receive inputted numeric or character information, and generate key signal input related to user settings and function control of the electronic device for image text recognition, such as a touch screen, a keypad, a mouse, a trackpad, a touch pad, a pointing stick, one or more mouse buttons, a trackball, a joystick and other input apparatus. The output apparatus 1204 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry systems, integrated circuit systems, specific ASICs (application specific integrated circuits), computer hardware, firmware, software, and/or combinations of them. These various implementations may include: being implemented in one or more computer programs that are executable and/or interpreted on a programmable system including at least one programmable processor, where the programmable processor may be a dedicated or general-purpose programmable processor that may receive data and instructions from a storage system, at least one input apparatus and at least one output apparatus, and transmit data and instructions to the storage system, the at least one input apparatus and the at least one output apparatus.

These computing programs (also known as programs, software, software applications, or code) include machine instructions of a programmable processor, and can utilize advanced processes and/or object-oriented programming languages, and/or assembly/machine languages to implement. As used herein, the terms "machine-readable medium" and "computer-readable medium" refer to any computer program product, device, and/or apparatus (for example, a magnetic disk, an optical disk, a memory, a programmable logic device (PLD)) used to provide machine instructions and/or data to the programmable processor, including machine-readable media that receive machine instructions as machine-readable signals. The term "machine-readable signal" refers to any signal used to provide machine instructions and/or data to the programmable processor.

In order to provide interaction with the user, the systems and technologies described here can be implemented on a computer that has: a display apparatus (for example, a CRT (cathode ray tube) or an LCD (liquid crystal display) monitor) for displaying information to the user; and a keyboard and pointing apparatus (for example, a mouse or a trackball) through which the user can provide input to the computer. Other kinds of apparatuses may also be used to provide interaction with the user, for example, the feedback provided to the user may be any form of sensory feedback (for example, visual feedback, auditory feedback, or tactile feedback); and may receive input from the user in any form (including acoustic input, voice input, or tactile input).

The systems and technologies described here can be implemented in a computing system that includes background components (for example, as a data server), or a computing system that includes middleware components (for example, an application server), or a computing system that includes front-end components (for example, a user computer with a graphical user interface or a web browser, through which the user can interact with the implementations of the systems and technologies described here), or a computing system that includes any combination of such background components, middleware components or front-end components. The components of a system may be interconnected by any form or medium of digital data communication (for example, a communication network).

Examples of the communication network include: a local area network (LAN), a wide area network (WAN), and the Internet.

A computer system can include a client and a server. The client and the server are generally remote from each other and usually interact through a communication network. A client-server relationship is generated by computer programs running on corresponding computers and having the client-server relationship with each other.

An embodiment of the present application further provides a method for image text recognition, including:

determining a composite encoded vector of each word in at least one text line of an image to be processed, where the composite encoded vector carries semantic information and position information; and processing the composite encoded vector corresponding to each word in each text line to obtain a text recognition result of the image to be processed.

For the specific implementation principles of this embodiment, reference can be made to the above description of the embodiments shown in FIG. 1 to FIG. 10, and details are not repeated here.

According to the technical solution of the embodiment of the present application, the image to be processed is acquired, where at least one text line exists in the image to be processed; each text line in the image to be processed is processed to obtain the composite encoded vector corresponding to each word in each text line, where the composite encoded vector carries the semantic information and the position information; and the text recognition result of the image to be processed is determined according to the semantic information and the position information carried in the composite encoded vector corresponding to each word in each text line. In this technical solution, not only are the semantic features of the text used, but also the position information of the text on the image is fused, which can accurately distinguish adjacent fields with small pixel spacing in the image and improve the accuracy of text recognition in the image.

It should be understood that the various forms of processes shown above can be used, and steps can be reordered, added, or deleted. For example, the steps described in the application may be executed in parallel, sequentially, or in different orders, as long as the desired results of the technical solutions disclosed in the application can be achieved, there is no limitation here.

The above specific implementations do not constitute a limitation to the protection scope of the present application. It should be understood by those skilled in the art that various modifications, combinations, sub-combinations, and substitutions may be performed according to design requirements and other factors. Any modification, equivalent replacement and improvement made within the spirit and principle of the application shall be included in the protection scope of the application.

What is claimed is:

1. A method for image text recognition, comprising:
   acquiring an image to be processed, wherein at least one text line exists in the image to be processed;
   processing each text line in the image to be processed to obtain a composite encoded vector corresponding to each word in each text line, wherein the composite encoded vector carries semantic information and position information;
   determining a text recognition result of the image to be processed according to the semantic information and the position information carried in the composite encoded vector corresponding to each word in each text line;
   determining a range of each field in each text line according to the text recognition result of the image to be processed, wherein each field comprises multiple words of which context semantic information is related to each other; and
   determining actual meaning of text in the image to be processed according to context semantic information of all words in a same field in each text line.

2. The method according to claim 1, wherein the processing each text line in the image to be processed to obtain a composite encoded vector corresponding to each word in each text line, comprises:
   analyzing semantics of each word in each text line in the image to be processed to obtain a semantic encoded vector corresponding to each word in each text line;
   determining coordinate information of each word in each text line in the image to be processed;
   performing encoding and dimensional transformation on the coordinate information of each word to obtain a position encoded vector of each word, where a dimension of the position encoded vector is the same as a dimension of the semantic encoded vector; and
   fusing the semantic encoded vector and the position encoded vector of each word to obtain the composite encoded vector of each word.

3. The method according to claim 2, wherein the analyzing semantics of each word in each text line in the image to be processed to obtain a semantic encoded vector corresponding to each word in each text line, comprises:
   for each word in the image to be processed, weighting and fusing semantic information of all words in the text line to which the each word belongs to obtain the semantic encoded vector of the each word.

4. The method according to claim 2, wherein the performing encoding and dimensional transformation on the coordinate information of each word to obtain a position encoded vector of each word, comprises:
   determining multiple pixel points representing each word in the image to be processed;
   determining a position vector of each word according to coordinate information of the multiple pixel points corresponding to each word; and
   performing dimensional transformation on the position vector of each word according to the dimension of the semantic encoded vector corresponding to each word to obtain the position encoded vector having the same dimension as the semantic encoded vector.

5. The method according to claim 1, wherein the determining a text recognition result of the image to be processed according to the semantic information and the position information carried in the composite encoded vector corresponding to each word in each text line, comprises:
   inputting the composite encoded vector corresponding to each word in each text line into a preset information analysis network to determine context information of each word, wherein the preset information analysis network is used to analyze the context information of each word;
   determining a category label to which each word belongs according to the context information of each word; and
   inputting the context information of each word in each text line and the category label to which each word belongs into a discriminant model to obtain the text recognition result of the image to be processed.

6. The method according to claim 1, wherein before processing each text line in the image to be processed to obtain a composite encoded vector corresponding to each word in each text line, the method further comprises:

performing optical character recognition on the image to be processed, and determining text lines in the image to be processed and the position information of each word in each text line.

7. An apparatus for image text recognition, comprising: at least one processor; and a memory communicatively connected to the at least one processor; wherein, the memory stores instructions executable by the at least one processor, and when the at least one processor executes the instructions, the at least one processor is configured to:

acquire an image to be processed, wherein at least one text line exists in the image to be processed;

process each text line in the image to be processed to obtain a composite encoded vector corresponding to each word in each text line, wherein the composite encoded vector carries semantic information and position information; and determine a text recognition result of the image to be processed according to the semantic information and the position information carried in the composite encoded vector corresponding to each word in each text line;

wherein the at least one processor is specifically configured to: analyze semantics of each word in each text line in the image to be processed to obtain a semantic encoded vector corresponding to each word in each text line; determine coordinate information of each word in each text line in the image to be processed; perform encoding and dimensional transformation on the coordinate information of each word to obtain a position encoded vector of each word, wherein a dimension of the position encoded vector is the same as a dimension of the semantic encoded vector; and fuse the semantic encoded vector and the position encoded vector of each word to obtain the composite encoded vector of each word;

wherein the at least one processor is further specifically configured to: determine multiple pixel points representing each word in the image to be processed; determine a position vector of each word according to coordinate information of the multiple pixel points corresponding to each word; and perform dimensional transformation on the position vector of each word according to the dimension of the semantic encoded vector corresponding to each word to obtain the position encoded vector having the same dimension as the semantic encoded vector.

8. The apparatus according to claim 7, wherein the at least one processor is specifically configured to: for each word in the image to be processed, weight and fuse semantic information of all words in the text line to which the each word belongs to obtain the semantic encoded vector of the each word.

9. The apparatus according to claim 7, wherein the at least one processor is specifically configured to: input the composite encoded vector corresponding to each word in each text line into a preset information analysis network to determine context information of each word, wherein the preset information analysis network is used to analyze the context information of each word; determine a category label to which each word belongs according to the context information of each word; and input the context information of each word in each text line and the category label to which each word belongs into a discriminant model to obtain the text recognition result of the image to be processed.

10. The apparatus according to claim 7, wherein the at least one processor is further configured to: before processing each text line in the image to be processed to obtain the composite encoded vector corresponding to each word in each text line, perform optical character recognition on the image to be processed, and determine text lines in the image to be processed and the position information of each word in each text line.

11. The apparatus according to claim 7, wherein the at least one processor is further configured to: determine a range of each field in each text line according to the text recognition result of the image to be processed, wherein each field comprises multiple words of which context semantic information is related to each other; and determine actual meaning of text in the image to be processed according to the context semantic information of all words in a same field in each text line.

12. A non-transitory computer-readable storage medium, having computer instructions stored thereon, wherein the computer instructions are used to enable a computer to execute the method according to claim 1.

13. A method for image text recognition, comprising:

determining a composite encoded vector of each word in at least one text line of an image to be processed, wherein the composite encoded vector carries semantic information and position information;

processing the composite encoded vector corresponding to each word in each text line to obtain a text recognition result of the image to be processed;

determining a range of each field in each text line according to the text recognition result of the image to be processed, wherein each field comprises multiple words of which context semantic information is related to each other; and determining actual meaning of text in the image to be processed according to context semantic information of all words in a same field in each text line.

* * * * *